United States Patent [19]
Silvi et al.

[11] Patent Number: 5,633,319
[45] Date of Patent: May 27, 1997

[54] COMPATIBILIZED BLENDS OF POLYETHERIMIDES AND LIQUID CRYSTALLINE POLYESTERS

[75] Inventors: Norberto Silvi, Clifton Park; Sterling B. Brown, Niskayuna; Mark H. Giammattei, Selkirk, all of N.Y.; King L. Howe, Wilmington, Del.

[73] Assignees: General Electric Company, Schenectady, N.Y.; E. I. Du pont de Nemours & Company, Wilmington, Del.

[21] Appl. No.: 587,055

[22] Filed: Jan. 16, 1996

[51] Int. Cl.$^6$ ....................... C08L 79/08
[52] U.S. Cl. ............... 525/133; 525/423; 525/425
[58] Field of Search ........................ 525/133, 423, 525/425

[56] References Cited

U.S. PATENT DOCUMENTS

| 4,664,972 | 5/1987 | Connolly . | |
|---|---|---|---|
| 4,728,698 | 3/1988 | Isayer | 525/425 |
| 4,835,047 | 5/1989 | Isayer | 525/425 |
| 4,871,817 | 10/1989 | Rock | 525/425 |
| 5,110,896 | 5/1992 | Waggoner et al. . | |
| 5,135,990 | 8/1992 | Bookbinder | 525/425 |
| 5,324,795 | 6/1994 | Suenaga . | |

FOREIGN PATENT DOCUMENTS

| 672721A2 | 3/1995 | European Pat. Off. . |
| 1315465 | 12/1989 | Japan . |
| 2041355 | 2/1990 | Japan . |

*Primary Examiner*—Patricia A. Short
*Attorney, Agent, or Firm*—William H. Pittman

[57] ABSTRACT

Non-delaminating resinous compositions are prepared by blending at least one polyetherimide, at least one liquid crystalline polyester in an amount to provide lower melt viscosity, and a compatibilizing amount of at least one polyepoxy compound. The compositions may also contain a minor proportion of at least one non-liquid crystalline polyester such as poly(ethylene terephthalate) or poly(ethylene 2,6-naphthalenedicarboxylate).

17 Claims, No Drawings

COMPATIBILIZED BLENDS OF POLYETHERIMIDES AND LIQUID CRYSTALLINE POLYESTERS

BACKGROUND OF THE INVENTION

This invention relates to polyetherimide blends, and more particularly to the preparation of compatible reinforced blends having low viscosity and high workability.

Thermoplastic polyetherimides are known polymers having many beneficial properties, especially high resistance to thermal distortion. However, their ductility and flow properties are often poor. In particular, they frequently have such high viscosities when worked (as by extrusion or molding) that they are very difficult to form. In addition, fillers, fibers and the like can be added to polyetherimides, but such addition adversely affects viscosity and make the compositions more difficult to process.

Thermotropic liquid crystalline polymers, particularly polyesters, have been considered as viscosity modifiers for thermoplastic resins. They have a tendency to form highly oriented structures when subjected to deformations in the melt state, and their rod-like molecular conformation and chain stiffness tend to make their properties similar in some respects to those of solid fibers with respect to reinforcement capability. In addition, liquid crystalline polyesters have low viscosities, low thermal expansion coefficients, good barrier properties to solvents and high thermal stability. All of these properties make such polyesters excellent candidates for use as viscosity modifiers for polyetherimides, capable of maintaining relatively low viscosity when compared to that of the neat polyetherimide.

A problem in polyetherimide-liquid crystalline polyester blends, however, is the incompatibility of the two polymers, resulting in poor adhesion between the polyetherimide and the liquid crystalline polyester. This incompatibility may lead to problems such as phase separation as demonstrated by delamination or the formation of skin-core layered structures during molding operations, particularly injection molding. By "delamination" is meant visually observed formation of poorly adhered layers at the surface or in the bulk of a test sample. Incompatibility may also lead to poor mechanical properties and marginal surface appearance (streaking, pearlescence, etc.) under abusive molding conditions; that is, conditions including high molding and/or extrusion temperatures or long residence times in the extruder and/or in the molding machine.

Japanese Kokai 1/315465 and 2/041355 disclose blends comprising polyetherimides, non-liquid crystalline polyesters such as poly(ethylene terephthalate) and ethylene-glycidyl methacrylate copolymers. Said copolymers improve the physical properties of these blends, particularly impact strengths as measured by the Izod and Dynatup methods. Blends of polyetherimides with non-liquid crystalline polyesters are not, however, characterized by incompatibility as are those with liquid crystalline polyesters, and thus there is no need for the presence of a polyepoxy compound as a compatibilizing agent.

U.S. Pat. No. 5,324,795 discloses blends of liquid crystalline polymers including polyesters, non-liquid crystalline polymers and "thickeners" which may be compounds containing epoxy groups. There is no specific disclosure of polyetherimides and no indication that the "thickener" serves any purpose other than increasing the melt viscosity, an effect which would be undesirable in the present context.

It would be advantageous, therefore, to develop compatibilization strategies for blends comprising a major proportion of thermoplastic polyetherimide and a minor viscosity modifying proportion of liquid crystalline polyester.

SUMMARY OF INVENTION

The present invention is based on the discovery that blends of polyetherimide with viscosity modifying amounts of liquid crystalline polyesters can be compatibilized by the addition of a minor proportion of a polyepoxy compound. The resulting compatibilized blends have high strength, excellent morphology and relatively low viscosity.

Accordingly, the invention includes non-delaminating resinous compositions comprising the following and any reaction products thereof:

(A) a major proportion of at least one polyetherimide, (B) a minor proportion, effective to provide an apparent viscosity in said composition, at 350° C. and a shear rate of 1000 sec$^{-1}$, lower than that of said polyetherimide, of at least one liquid crystalline polyester, and (C) a minor proportion, effective to compatibilize components (A) and (B) and suppress delamination in said composition, of at least one polyepoxy compound.

Another aspect of the invention is compositions of the same type which further comprise (D) a minor proportion of at least one non-liquid crystalline polyester or copolyester.

DETAILED DESCRIPTION ; PREFERRED EMBODIMENTS

The invention is inclusive of simple blends of the above-designated materials and also of compositions in which two or more of said materials have undergone chemical reaction. When proportions are specified, they apply to the originally incorporated materials rather than those remaining after any such reaction.

The polyetherimides employed as component A according to the invention include those comprising structural units of the formula

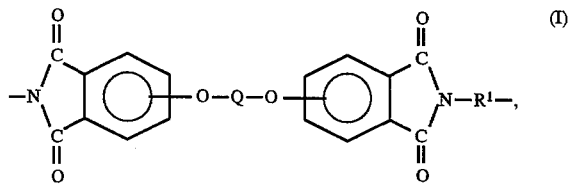

wherein Q is a divalent aromatic hydrocarbon or substituted hydrocarbon radical and R$^1$ is a divalent aromatic hydrocarbon radical containing about 6–20 carbon atoms or a halogenated derivative thereof, an alkylene or cycloalkylene radical containing about 2–20 carbon atoms or a bisalkylene (polydialkylsiloxane) radical.

In formula I, the Q value may be attached through oxygen to the aromatic rings in formula I in the 3- or 4-positions, preferably the 4-positions, with respect to the free valence bonds. Illustrative Q radicals are derived from such compounds as resorcinol, hydroquinone, 4,4'-dihydroxybiphenyl, 4,4'-dihydroxy-3,3',5,5'-tetramethylbiphenyl, 4,4'-dihydroxydiphenylmethane, 3,4'-dihydroxydiphenylmethane, 2,2-bis(3-hydroxyphenyl) propane, 2,2bis(4-hydroxyphenyl)propane ("bisphenol A"), 2-(3-hydroxyphenyl)-2(4-hydroxyphenyl)propane, 1,1-bis (4-hydroxyphenyl)ethane, 2,2bis(4-hydroxyphenyl)pentane, 4,4'-dihydroxybenzophenone, bis(4-hydroxyphenyl) ether, bis(4-hydroxyphenyl) sulfide, bis(4-hydroxyphenyl) sulfoxide, bis(4-hydroxyphenyl) sulfone and 3-hydroxyphenyl-4-hydroxyphenyl sulfone.

The most preferred Q values are those having the formulas

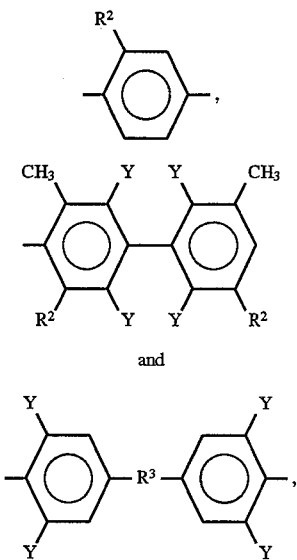

wherein each $R^2$ is independently hydrogen or methyl, $R^3$ is a straight chain or branched alkylene radical containing 1–5 carbon atoms and is most often the isopropylidene radical, and each Y is independently hydrogen or halogen (usually chlorine or bromine). Especially desirable is the radical derived from bisphenol A by the removal of both hydroxy groups therefrom, and having formula IV wherein $R^3$ is isopropylidene and each Y is hydrogen.

The $R^1$ value is as previously defined and may be considered as being derived from a diamine of the formula $R^1(NH_2)_2$. Examples of suitable $R^1$ values are those in such diamines as ethylenediamine, propylenediamine, trimethylenediamine, diethylenetriamine, triethylenetetramine, heptamethylenediamine, octamethylenediamine, 2,11-dodecanediamine, 1,12-octadecanediamine, 3-methylheptamethylenediamine, 4,4-dimethylheptamethylenediamine, 4-methylnonamethylenediamine, 2,5-dimethylhexamethylenediamine, 2,2-dimethylpropylenediamine, N-methyl-bis(3-aminopropyl) amine, 3-methoxyhexamethylenediamine, 1,2-bis(3-aminopropoxy)ethane, bis(3-aminopropyl) sulfide, 1,4-cyclohexanediamine, bis-(4aminocyclohexyl)methane, m-phenylenediamine, pphenylenediamine, 2,4-diaminotoluene, 2,6-diaminotoluene, m-xylylenediamine, p-xylylenediamine, benzidine, 3,3'-dimethylbenzidine, 3,3'-dimethoxybenzidine, 1,5-diaminonaphthalene, bis(4-aminophenyl)methane, bis(4aminophenyl)propane, 2,4-bis(β-amino-t-butyl)toluene, bis(p-β-methyl-o-aminopentyl) benzene, 1,3-diamino-4-isopropylbenzene, bis(4-aminophenyl) sulfone, bis(4-aminophenyl) ether and 1,3-bis (3-aminopropyl)tetramethyldisiloxane. Mixtures of these $R^1$ values may also be present. Preferably, $R^1$ is an aromatic hydrocarbon radical.

For most purposes, the preferred polyetherimides are those of the type prepared by the reaction of 2,2-bis[4-(3, 4-dicarboxyphenoxy)phenyl]propane dianhydride (hereinafter "BPADA") with at least one of p- and m-phenylenediamine, most often having end groups resulting from the employment of aniline or, preferably, phthalic anhydride as an endcapping agent. Such polyetherimides are commercially available from General Electric Company under the trademark ULTEM. They most often have weight average molecular weights in the range of about 5,000–100,000, as determined by gel permeation chromatography relative to polystyrene.

Any liquid crystalline polyester may be employed as component B, including both crystalline and amorphous resins. Numerous types of liquid crystalline polyesters are disclosed in the aforementioned U.S. Pat. No. 5,324,795, the disclosure of which is incorporated by reference herein. Included are polyesters derived from a mixture of 4-hydroxybenzoic and 6-hydroxy-2-naphthoic acids and disclosed in U.S. Pat. No. 4,161,470.

The preferred liquid crystalline polyesters include those described in U.S. Pat. No. 4,664,972, which are prepared from (I) an aromatic diol component which includes a major proportion of t-butylhydroquinone and a minor proportion of a polyaromatic diol, (II) a dicarboxylic acid component which can be, for example, isophthalic acid, terephthalic acid or 1,4-cyclohexanedicarboxylic acid, and (III) an aromatic hydroxycarboxylic acid component which may be at least one of 4-hydroxybenzoic acid, 6-hydroxy-2-naphthoic acid and 4-(4'-hydroxyphenyl)benzoic acid. Also included are the polyesters of U.S. Pat. No. 5, 110,896 which consist essentially of specific proportions of structural units derived from each of hydroquinone, 4,4'-dihydroxybiphenyl, terephthalic acid, 2,6-naphthalenedicarboxylic acid and 4-hydroxybenzoic acid. Polyesters comprising said units and further containing units derived from 6-hydroxy-2-naphthoic acid are also suitable.

Non-liquid crystalline polyesters or copolyesters (hereinafter both sometimes simply designated "polyesters" for brevity) may also be incorporated in the compositions of this invention as component D, particularly when it is desired to compensate for any viscosity increase caused by the addition of polyepoxy compound. Suitable polyesters for use as component D include those comprising structural units of the formula

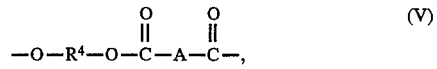

wherein $R^4$ is an alkylene radical typically containing 2 or 3 carbon atoms or an arylene radical and A is an aromatic or alicyclic radical. Preferably, A is aromatic and especially p-phenylene, m-phenylene or 2,6-naphthylene and $R^4$ is ethylene. The preferred arylene radical is often the 2,2-bis (p-phenylene)isopropylidene radical, derived from bisphenol A. Thus, polyarylates are among the useful polyesters.

Copolyesters include the copolyestercarbonates, which contain units of formula V in combination with aromatic carbonate units. In general, $R^4$ in the copolyestercarbonates is at least one arylene radical.

Polyepoxy compounds which may be employed as component C according to this invention include simple aliphatic diepoxides such as dodecatriene dioxide, dipentene dioxide and 1,2,7,8-diepoxyoctane; bis-glycidyl ethers/esters such as the bisglycidyl ether of bisphenol A and its condensation products; alicyclic diepoxides such as 3,4-epoxycyclohexyl 3,4-epoxycyclohexanecarboxylate and bis(3,4-epoxycyclohexylmethyl) adipate; mixed aliphatic/alicyclic diepoxides such as vinylcyclopentadiene dioxide and butenylcyclopentene dioxide; epoxidized novolak resins; epoxidized heterocycles such as triglycidyl isocyanurate; addition polymers of ethylenically unsaturated epoxy compounds such as glycidyl methacrylate; and epoxidized oils such as epoxidized tall oil, linseed oil and soybean oil.

The preferred polyepoxy compounds for most purposes are addition polymers and glycidyl ethers of novolak resins; addition polymers are frequently preferred since they also function as impact modifiers even upon processing under the high temperature conditions generally required for polyetherimides.

When a polyepoxy compound which is in particulate rather than pelletized form, such as an epoxidized novolak, is employed it is generally desirable to incorporate a minor amount of a lubricant in the composition to facilitate uniform dispersion of the polyepoxy compound in the blend of pelletized polymers. Suitable lubricants include hydrogenated α-olefin polymers.

Constituent proportions in the compositions of this invention are based on the ability of the liquid crystalline polyester (component B) to provide an apparent viscosity in said compositions, at 350° C. and a shear rate of 1000 sec$^{-1}$, lower than that of the neat polyetherimide, and the ability of the polyepoxy compound (component C) to compatibilize components A and B so as to produce a non-delaminating blend as described hereinabove. The "apparent viscosity" is defined as the ratio of apparent shear stress at the relevant temperature to apparent shear rate.

For blends of components A and B alone, component B typically comprises about 2–8% by weight of the combination of components A and B. Component C can comprise about 0.3–12.0 phr. (i.e., pads by weight per 100 parts of the combination of polyetherimide and polyesters). Lubricant, when employed, is generally in the amount of about 0.5–2.0 phr.

When component D is also present in the blend, somewhat larger proportions of both component B and component C are typical. Typically, component B and the non-liquid crystalline polyester will each be present in the amount of about 8–13% by weight of the combination of polyetherimide and polyesters, while the proportion of component C will be about 8–12 phr.

The effectiveness of polyepoxy compounds as compatibilizing agents for the compositions of this invention is demonstrated by scanning electron microscopy studies, after fracturing using liquid nitrogen, of test plaques molded from the compositions of this invention and of control compositions containing no polyepoxy compound. In the "core" section near the plane of symmetry of the plaque, the compositions of this invention show elongated particles of liquid crystalline polyester aligned in a preferential direction while the control samples show much smaller liquid crystalline polyester particles with almost no alignment or deformation. The "skin" areas near the mold surface have similar morphologies for the sample of the invention and the control, both constituting elongated particles of liquid crystalline polyester aligned within the continuous phase. Thus, the skin and core regions of the plaques made from the blends of this invention are much more similar in morphology than similar regions in the control plaques.

The differences in morphology are also discernible visually upon inspection of plaques fractured by the Dynatup impact test. Plaques prepared from the compositions of this invention are essentially uniform in composition throughout. In some cases, such plaques will be split (i.e., will fracture perpendicular to the planar surface of the plaque) during the test and such compositions are principally useful where impact strength is not an important factor such as for the fabrication of electrical connectors. Other plaques made from compositions of this invention are ductile. However, plaques made from the control blends not containing the polyepoxy compound show a clearly visible laminar structure which is subject to shattering during the impact test.

The compositions of this invention may be prepared by any intimate blending method suitable for use with relatively viscous polymers. Continuous methods such as extrusion, using a single- or twin-screw extruder and preferably the latter, are usually preferred, with all constituents ordinarily being added through the extruder hopper. When a lubricant is employed, it is most often used to wet the resin pellets after which the particulate polyepoxy compound is dusted on the wetted pellets.

It has been previously mentioned that Japanese Kokai 1/315465 and 2/041355 disclose blends comprising polyetherimides, non-liquid crystalline polyesters such as poly(ethylene terephthalate) and ethylene-glycidyl methacrylate copolymers, but that said copolymers are not needed as compatibilizers. This is demonstrated by the fact that blends of 90% polyetherimide and 10% poly(ethylene terephthalate) have no more tendency to delaminate than similar blends also containing 5 phr of ethylene-glycidyl methacrylate copolymer. The same is true of blends of 78% polyetherimide and 22% poly(ethylene terephthalate), whether or not they also contain 10 phr of ethylene-glycidyl methacrylate copolymer.

The invention is illustrated by the following examples. All parts are by weight unless otherwise specified. Molecular weights were determined by gel permeation chromatography relative to polystyrene. The following constituents were employed:

Polyetherimide 1: reaction product of BPADA and m-phenylenediamine, endcapped with phthalic anhydride; Mw 54,000, Mn 21,000.

Polyetherimide 2: reaction product of BPADA and m-phenylenediamine, endcapped with phthalic anhydride; Mw 35,000, Mn 12,000.

LCP 1: crystalline liquid crystalline polyester comprising 1 mole each of hydroquinone, 4,4'-dihydroxybiphenyl and 6-hydroxy-2-naphthoic acid units, 1.4 moles of terephthalic acid units, 0.6 mole of 2,6-naphthalenedicarboxylic acid units and 5.4 moles of 4hydroxybenzoic acid units.

LCP 2: amorphous liquid crystalline polyester comprising 26 mole percent t-butylhydroquinone units, 6.7 mole percent 4,4'-dihydroxybiphenyl units and 33.3 mole percent each of terephthalic acid and 4-hyroxybenzoic acid units.

Polyepoxide 1: ethylene-glycidyl methacrylate copolymer comprising 12% glycidyl methacrylate and having a melt flow rate of 3 g/10 min, supplied by Sumitomo Chemical under the designation "Bondfast E" or "lgetabond E".

Polyepoxide 2: reaction product of o-cresol novolak with epichlorohydrin, supplied by Ciba-Geigy under the designation "ECN 9495".

Polyepoxide 3: reaction product of o-cresol novolak with epichlorohydrin, supplied by Ciba-Geigy under the designation "ECN 1299".

Polyestercarbonate: bisphenol A isophthalate-terephthalate polyestercarbonate having about 60% ester and 40% carbonate units, an isophthalate-terephthalate molar ratio of 1:1 and a weight average molecular weight of about 28,000.

Polyarylate: bisphenol A isophthalate-terephthalate polyarylate having an isophthalate-terephthalate molar ratio of 1:1 and an intrinsic viscosity in a 60:40 phenol-tetrachloroethane mixture of 0.71 dl/g.

Lubricant: hydrogenated α-olefin polymer supplied by Henkel under the designation "Emery 3008".

Polyester 1: poly(ethylene terephthalate) supplied by Goodyear under the designation "9505A".

Polyester 2: poly(ethylene 2,6-naphthalenedicarboxylate) having an intrinsic viscosity of 0.75 dl/g at 30° C. in a 1:1 (by weight) mixture of phenol and 1,1,2,2-tetrachloroethane.

EXAMPLES 1–5

Blends of polyetherimide, liquid crystalline polyester and polyepoxy compound, in some instances (Examples 4 and 5) also containing non-liquid crystalline polyester, were prepared by extrusion in a twin screw extruder at temperatures in the range of 260°–350° C., with vacuum venting. The extrudates were molded into test parts and evaluated for various properties including apparent viscosity, surface quality, Izod impact strength (ASTM procedure D256), Dynatup impact strength (ASTM procedure D3763) and flexural properties (ASTM procedure D790).

The results are given in Table I, in comparison with four controls: Controls 1 and 2 in which no polyepoxy compound or lubricant was employed, and Controls 3 and 4 which were neat polyetherimides. Further visual characterization of the Dynatup failure mode is designated "S" to indicate a split perpendicular to the planar surface of the specimen.

EXAMPLE 6

A blend of 94.8% Polyetherimide 1, 5.2% of LCP 2 and 3 phr. of Polyepoxide 1, prepared as described in Examples 1–5, had an apparent viscosity of 676 Pa-sec, an Izod impact strength of 106.8 j/m, a flexural modulus of 3.04 GPa and the following Dynatup results: max. load 494 kg, total energy 39.3J, failure mode ductile/split.

The improvements demonstrated in the examples herein are not uniform across all proportion ranges of the constituents of the compositions of this invention, even when polyetherimide is maintained as the major constituent. However, there is a substantial correlation between improved properties and incorporation of the liquid crystalline polyester, and those skilled in the art can readily select blends having the properties they desire.

EXAMPLES 7–8

Blends similar to those of Examples 4–5 were prepared, substituting Polyestercarbonate and Polyarylate for the non-liquid crystalline polyesters. The blend parameters and test results are listed in Table II.

TABLE I

|  | Example | | | | | Control | Control | Control | Control |
| --- | --- | --- | --- | --- | --- | --- | --- | --- | --- |
|  | 1 | 2 | 3 | 4 | 5 | 1 | 2 | 3 | 4 |
| Polyetherimide 1, % | — | 95 | 94.7 | 77.8 | 77.8 | — | 95 | — | 100 |
| Polyetherimide 2, % | 94.7 | — | — | — | — | 95 | — | 100 | — |
| LCP 1, % | 5.3 | 5 | 5.3 | 11.1 | 11.1 | 5 | 5 | — | — |
| Polyepoxide 1, phr. | 5 | — | 5 | 10 | 10 | — | — | — | — |
| Polyepoxide 2, phr. | — | 1.25 | — | — | — | — | — | — | — |
| Polyester 1, % | — | — | — | 11.1 | — | — | — | — | — |
| Polyester 2, % | — | — | — | — | 11.1 | — | — | — | — |
| Lubricant, phr. | — | 1 | — | — | — | — | — | — | — |
| Apparent visc., Pa-sec* | 257 | 459 | 614 | 288 | 337 | 191 | 365 | 264 | 942 |
| Delamination | No | No | No | No | No | Yes | Yes | — | — |
| Izod impact strength, J/m** | 90.8 | 58.7 | 208.8 | 250.9 | 147.4 | 31.5 | 67.3 | 21.4 | 65.7 |
| Dynatup impact strength: | | | | | | | | | |
| Max. load, kg | 605 | 800 | 653 | 657 | 705 | 131 | 113 | — | 449 |
| Total energy, J | 38.0 | 66.4 | 59.7 | 59.7 | 65.1 | 2.7 | 8.1 | — | 21.7 |
| Failure mode*** | DS | DS | D | DS | DS | B | B | B | B |
| Heat distortion temp., °C.**** | 192 | 198 | 192 | 160 | 166 | 189 | 196 | 197 | 200 |
| Flexural modulus, GPa | 2.8 | 3.3 | 2.8 | 2.3 | 2.4 | 3.3 | 3.3 | 3.3 | 3.3 |

*350° C., apparent shear rate 1000 sec$^{-1}$
**Notched, at 23° C.
***B- brittle, D-ductile, S-split
****At 1.82 MPA A comparison of Example 1 with Controls 1 and 3 shows improvements in Izod and Dynatup impact strengths, as well as decrease in apparent viscosity compared to neat polyetherimide, attributable to the present invention. Similar trends are shown upon comparison of Examples 2 and 3 with Controls 2 and 4, as well as substantial improvements in ductility and freedom from delamination. Other properties such as heat distortion temperature and modulus are comparable to those of the controls.

A comparison of Examples 4 and 5 with Examples 2 and 3 shows a further decrease in apparent viscosity resulting from the inclusion in the composition of a non-liquid crystalline polyester, with only moderate decreases in modulus and heat distortion temperature.

TABLE II

|  | Example | | Control 2 | Control 4 |
| --- | --- | --- | --- | --- |
|  | 7 | 8 | | |
| Polyetherimide 1, % | 77.8 | 77.8 | 95 | 100 |
| LCP 1, % | 11.1 | 11.1 | 5 | — |
| Polyarylate, % | 11.1 | — | — | — |
| Polyestercarbonate, % | — | 11.1 | — | — |
| Polyepoxide 1, phr. | 10 | 10 | — | — |
| Apparent visc., Pa-sec | 505 | 386 | 365 | 942 |
| Delamination | No | No | Yes | — |
| Izod impact strength, J/m | 341.7 | 267.0 | 67.3 | 65.7 |

TABLE II-continued

| | Example | | | |
|---|---|---|---|---|
| | 7 | 8 | Control 2 | Control 4 |
| Dynatup impact strength: | | | | |
| Max. load, kg | 288 | 149 | 113 | 449 |
| Total energy, J | 33.9 | 19.0 | 8.1 | 21.7 |
| Failure mode | D/B | B | B | B |
| Flexural modulus, GPa | 2.2 | 2.3 | 3.3 | 3.3 |

It is apparent that the viscosity, impact strength and freedom from delamination advantages as compared with the controls extend to these blends.

EXAMPLES 9-13

Blends of 95% Polyetherimide 1, 5% LCP 1 and various proportions of Polyepoxide 3 were prepared, using a procedure similar to that of Examples 1-5. Test specimens were molded and evaluated for physical properties and compatibility as evidenced visually by lack of delamination. Some of the results are given in Table III in comparison with Controls 2 and 4.

TABLE III

| Example | Polyepoxide 3, phr | Tensile elong., % | Compatibility | Melt visc., Pa-sec* |
|---|---|---|---|---|
| 9 | 0.5 | 73 | Good | 653 |
| 10 | 0.75 | 83 | Good | 718 |
| 11 | 1.0 | 44.5 | Good | 748 |
| 12 | 1.25 | 44 | Good | 668 |
| 13 | 2.5 | 40.4 | Good | 651 |
| Control 2 | — | 3.6 | Poor | 512 |
| Control 4 | — | 52 | Poor | 932 |

*350° C., apparent shear rate 1000 sec$^{-1}$

It is apparent from Table III that the compositions of this invention have improved compatibility as compared to the controls, tensile elongation at least comparable to and often superior to that of Polyetherimide 1 alone (Control 4), and tensile elongations greatly superior to those of an uncompatibilized polyetherimide/LCP blend (Control 2) and melt viscosity much lower than that of Polyetherimide 1 alone. Other physical properties, including tensile strength, flexural modulus and notched Izod impact strength, were essentially comparable for the controls and the compositions of the invention.

What is claimed is:

1. A non-delaminating resinous composition comprising the following and any reaction products thereof:

(A) a major proportion of at least one polyetherimide.

(B) a minor proportion, effective to provide an apparent viscosity in said composition, at 350° C. and a shear rate of 1000 sec$^{-1}$, lower than that of said polyetherimide, of at least one liquid crystalline polyester, and (C) a minor proportion, effective to compatibilize components (A) and (B) and suppress delamination in said composition, of at least one polyepoxy compound.

2. A composition according to claim 1 wherein component A comprises structural units of the formula

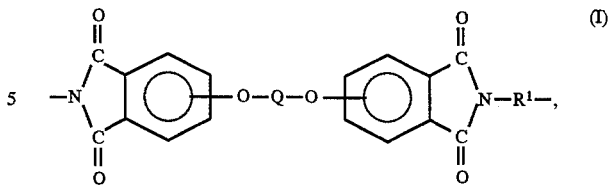

wherein Q is a divalent aromatic hydrocarbon or substituted hydrocarbon radical and $R^1$ is a divalent aromatic hydrocarbon radical containing about 6-20 carbon atoms or a halogenated derivative thereof, an alkylene or cycloalkylene radical containing about 2-20 carbon atoms or a bisalkylene (polydialkylsiloxane) radical.

3. A composition according to claim 2 wherein Q has the formula

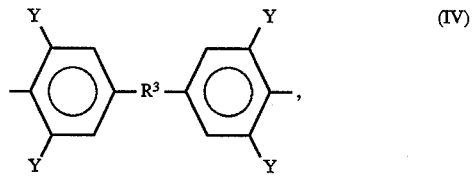

and is attached through oxygen to the aromatic rings in formula I in the 4-positions, $R^3$ is isopropylidene and each Y is hydrogen.

4. A composition according to claim 3 wherein $R^1$ is m- or p-phenylene.

5. A composition according to claim 2 wherein component C is an addition polymer of an ethylenically unsaturated epoxy compound or an epoxidized novolak resin.

6. A composition according to claim 5 wherein component C is an ethylene-glycidyl methacrylate copolymer.

7. A composition according to claim 5 wherein component C is a glycidyl ether of a novolak resin and said composition further comprises a lubricant.

8. A composition according to claim 2 wherein component B comprises about 2-8% by weight of the combination of components A and B, and component C comprises about 0.3-12.0 parts by weight per 100 parts of the combination of components A and B.

9. A composition according to claim 8 wherein the polyepoxy compound is an epoxidized novolak resin and said composition further comprises a lubricant in the amount of about 0.5-2.0 parts by weight per 100 parts of the combination of components A and B.

10. A composition according to claim 9 wherein said lubricant is a hydrogenated α-olefin polymer.

11. A composition according to claim 2 which further comprises (D) a minor proportion of at least one non-liquid crystalline polyester or copolyester.

12. A composition according to claim 11 wherein component D comprises structural units of the formula

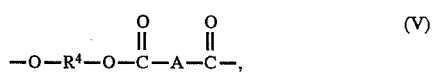

wherein $R^4$ is an alkylene radical typically containing 2 or 3 carbon atoms and A is an aromatic or alicyclic radical.

13. A composition according to claim 12 wherein components B and D are each present in the amount of about 8-13% by weight of the combination of polyetherimide and polyesters, and component C is present in the amount of about 8-12 parts by weight per 100 parts of the combination of polyetherimide and polyesters.

14. A composition according to claim 13 wherein $R^4$ is ethylene and A is p-phenylene or 2,6-naphthylene.

15. A composition according to claim 13 wherein component D is a polyarylate.

16. A composition according to claim 13 wherein component D is a polyestercarbonate.

17. A composition according to claim 2 wherein component B comprises structural units derived from each of hydroquinone, 4,4'-dihydroxybiphenyl, terephthalic acid, 2,6-naphthalenedicarboxylic acid, 4-hydroxybenzoic acid and 6-hydroxy-2-naphthoic acid.

* * * * *